United States Patent [19]

Otto

[11] 4,207,371
[45] Jun. 10, 1980

[54] CERAMIC VENEER

[75] Inventor: Joachim Otto, Giessen, Fed. Rep. of Germany

[73] Assignee: Wilhelm Gail'sche Tonwerke KGaA, Giessen, Fed. Rep. of Germany

[21] Appl. No.: 969,964

[22] Filed: Dec. 15, 1978

Related U.S. Application Data

[63] Continuation of Ser. No. 829,498, Aug. 31, 1977, abandoned.

[30] Foreign Application Priority Data

Sep. 2, 1976 [DE] Fed. Rep. of Germany ....... 2639522

[51] Int. Cl.² .............................................. B32B 17/06
[52] U.S. Cl. .................................... 428/212; 156/89; 156/285; 156/312; 156/314; 156/319; 264/56; 264/58; 264/60; 428/241; 428/251; 428/268; 428/273; 428/428; 428/454
[58] Field of Search ............... 428/212, 241, 251, 268, 428/273, 428, 446, 454; 156/89, 285, 312, 314, 319; 264/56, 58, 60, 1, DIG. 36, DIG. 39

[56] References Cited

U.S. PATENT DOCUMENTS

| | | | |
|---|---|---|---|
| 1,345,377 | 7/1920 | Linbarger | 428/212 |
| 3,911,188 | 10/1975 | Torti | 428/212 |

FOREIGN PATENT DOCUMENTS

| | | | |
|---|---|---|---|
| 2061105 | 5/1974 | Fed. Rep. of Germany | 428/454 |
| 2201435 | 8/1975 | Fed. Rep. of Germany | 428/454 |

*Primary Examiner*—Marion E. McCamish
*Attorney, Agent, or Firm*—Blanchard, Flynn, Thiel, Boutell & Tanis

[57] ABSTRACT

A ceramic veneer manufactured from a thin-fluid slip by drying and baking of the slip. The slip consists of at least two different layers which have either different shrinkage rates during baking and/or different co-efficients of thermal expansion in the baked condition. The shrinkage rates and the coefficients of thermal expansion of the individual layers are determined such that the veneer remains of a uniform thickness throughout the manufacturing process.

6 Claims, 3 Drawing Figures

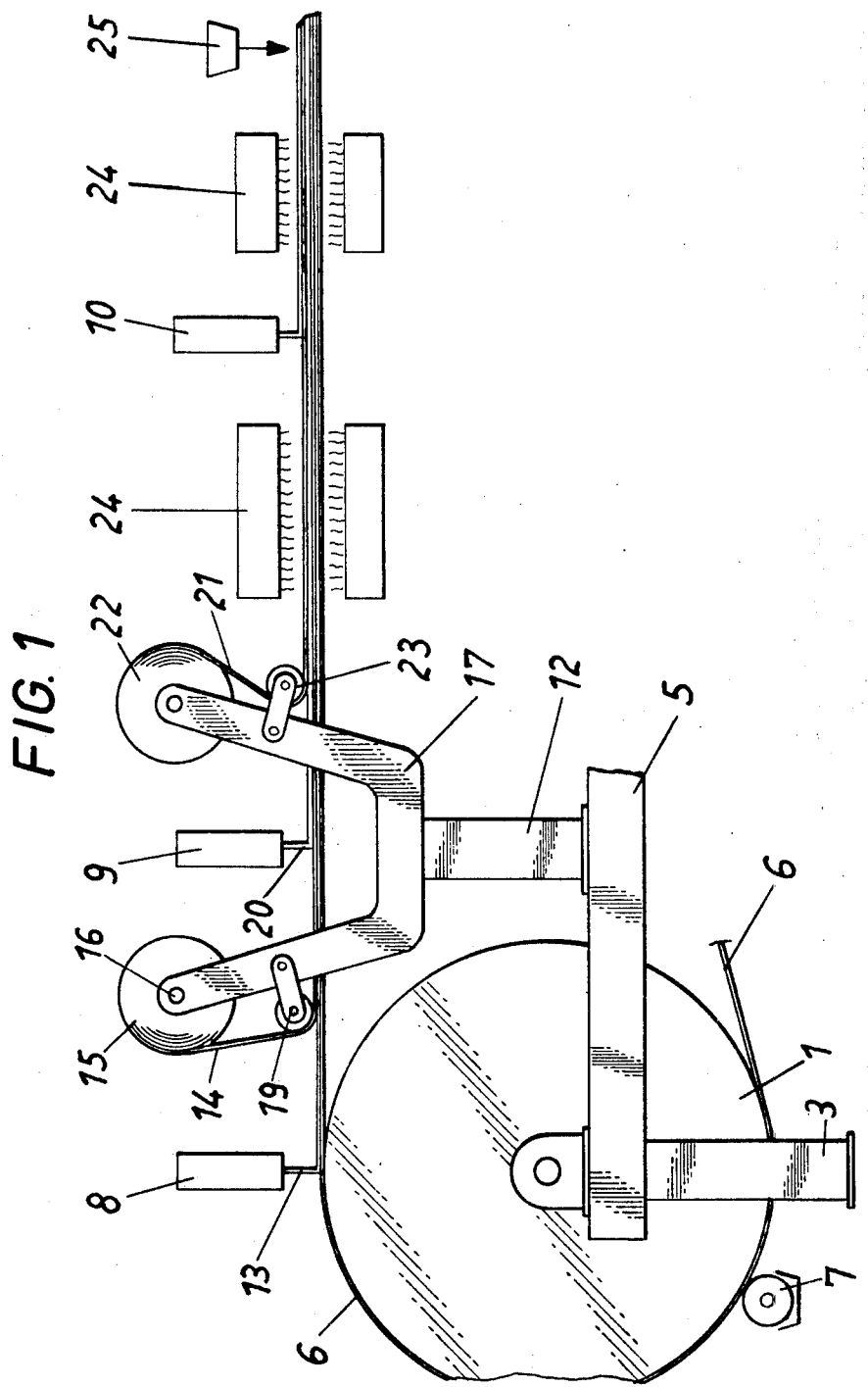

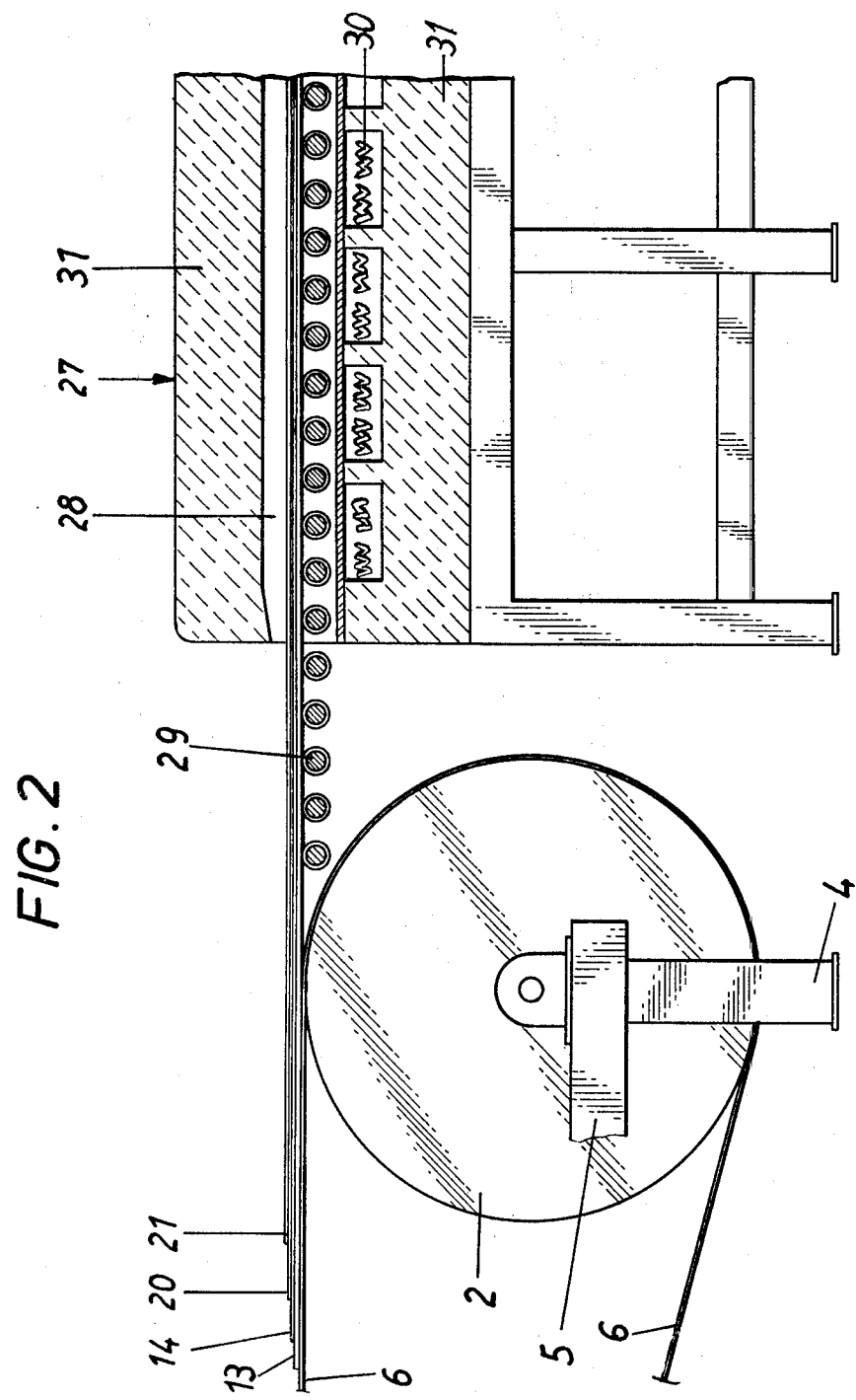

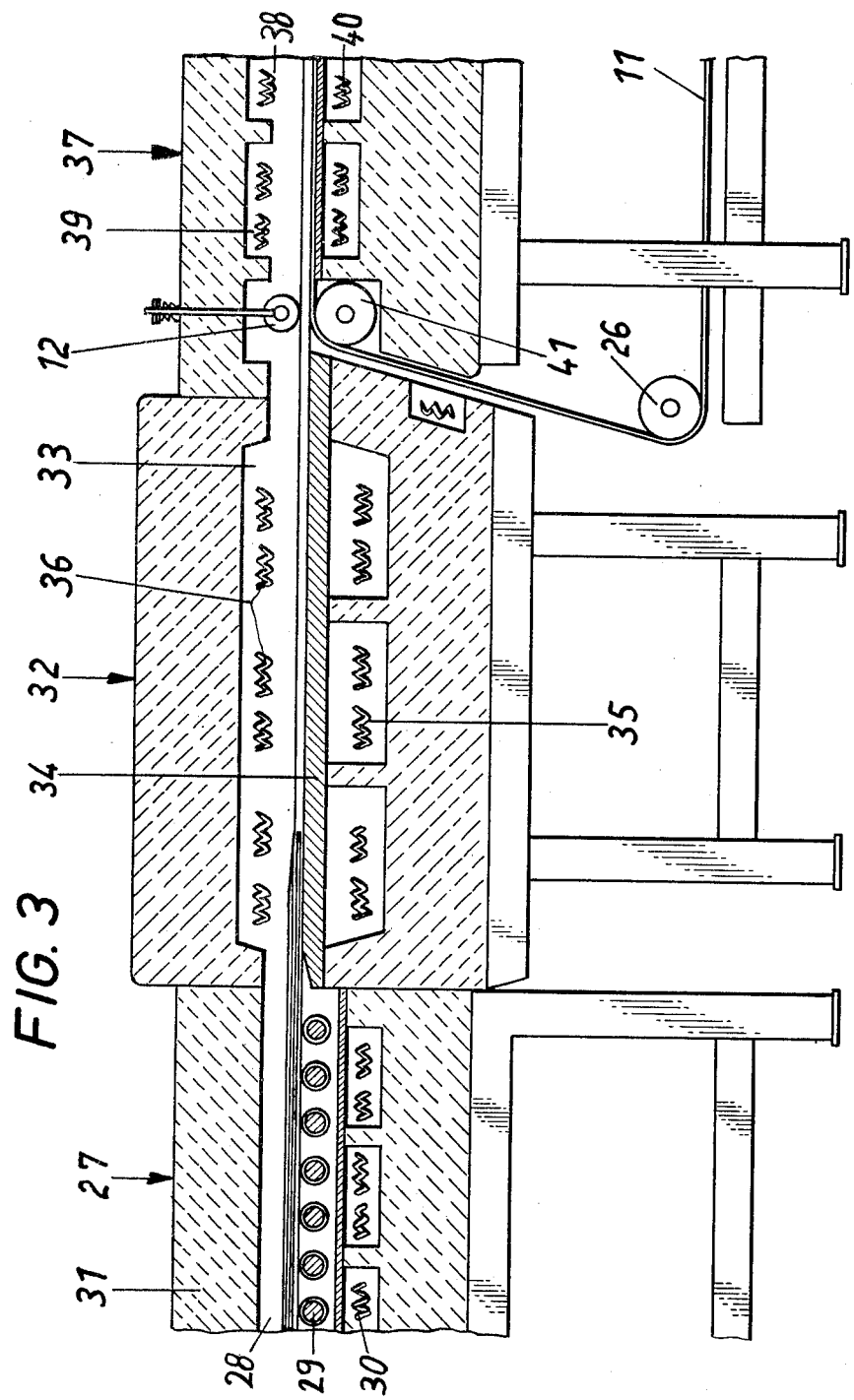

CERAMIC VENEER

This is a continuation, of application Ser. No. 829,498, filed Aug. 31, 1977, now abandoned.

FIELD OF THE INVENTION

The invention relates to a ceramic veneer which is manufactured from a thin-fluid slip by a drying and baking of the slip.

BACKGROUND OF THE INVENTION

Such veneers are manufactured in many ways but one such way is to apply the slip on an endlessly rotating belt and at a thickness which is as uniform as possible, dried while on the belt and is baked subsequently in a kiln. A disadvantage of this method is that a large percentage portion of the manufactured veneers are nonusable because the veneers are uneven and/or are curved at the edges. The purpose of the invention is to manufacture a veneer made of a slip, which remains uniform in its thickness during baking and during the subsequent cooling.

SUMMARY OF THE INVENTION

The inventive veneer consists of at least two different layers which are manufactured of slip, which have either different shrinkage rates during baking and/or different coefficients of thermal expansion in baked condition. The shrinkage rates and coefficients of thermal expansion are determined so that the veneer remains level or of uniform thickness during baking and during cooling.

A veneer which is manufactured of an even or uniformly thick slip has no reason to shrink unevenly during baking or to expand unevenly during cooling. However, as has been discovered, the combination of components making up the wet slip layer does not remain even during drying. Slip consists of fine clay particles and of coarser hard particles, as for example finely crushed fireclay and others. During drying, the coarser particles settle in the lower part of the slip layer, the fine particles remain on top. The shrinkage rates and the coefficient of expansion along the height or thickness of the layer become then uneven and the veneer is deformed during baking and during cooling.

The uneven distribution of the slip particles, which occurs during drying, can also not be avoided in the two layers of the inventive veneer, however, one can choose the additives to the two different slips so that the center values of the shrinkage rates and of the coefficients of thermal expansion assume values which prevent a deformation of the veneer in the kiln and during the subsequent cooling process. Differences in the shrinkage rates can be achieved for example in the case of an otherwise equal composition of two slips in such a manner that one slip has added thereto finely ground glow fireclay (i.e., clay that is fired at 800° to 900° C. so as to lose its plastic characteristics yet not shrink) and the other one finely ground baked fireclay. Further examples are mentioned at a later point in the description.

BRIEF DESCRIPTION OF THE DRAWINGS

The invention and an arrangement or device for carrying out the invention are described hereinafter with reference to the drawings, in which:

FIG. 1 schematically illustrates a partial side view, partly in a cross section of a device for applying the slip on an endless carrier and conveyor belt;

FIG. 2 is a cross-sectional view of the end of the aforementioned conveyor belt and the front part of a drying oven; and FIG. 3 is also a cross-sectional view of the rear part of the drying oven, a kiln and a cooling oven following thereafter for receiving the baked veneer.

DETAILED DESCRIPTION

Two rollers are identified by the reference numerals 1 and 2 in FIGS. 1 and 2, respectively, of the drawings and are rotatably supported in a frame consisting of two posts 3 and 4 and a bridging member 5. A carrier belt 6 is looped around these rollers and is used to receive and transport the slip. Reference numerals 7, 8, 9 and 10 identify schematically illustrated application devices.

The first application device 7 is used to apply form oil to prevent the adhesion of the slip to the belt. The second application device 8 applies a first slip layer onto the belt, so that it forms a thin layer 13. A glass fleece 14 is introduced into this layer. The fleece is rolled off from a roll 15, the axis 16 of which is supported in an arm 17 of a frame 12 mounted on and extends upwardly from the bridging member 5. The fleece 14 is pressed into engagement with the slip layer 13 by a roller 19 which is rotatably supported on the arm 17 so that it becomes soaked with the slip. A second slip layer 20 is applied with the third application device 9 onto the now soaked fleece 14 and a glass fleece 21 is applied onto said second slip layer. The fleece 21 comes from a roll 22 and is pressed into the slip layer 20 by a roller 23 to soak the fleece 21 with the slip of slip layer 20.

Reference numeral 24 identifies an arrangement of radiant heating members which are used to dry the slip layers 13 and 20. Finally the fourth application device 10, if desired, applies a glaze mixture 25.

From the belt 6 the predried veneer, as shown in FIG. 2, travels into a drying oven which is identified as a whole by the reference numeral 27. The oven forms a channel 28. Transport rollers 29 and heat resistors 30 are arranged in said channel. The channel is closed off on top and below and on the sides by fireproof walls 31. The rollers 29 are used to transport the predried veneer, the solidity of which, which has been reached in the meantime, permits further transport on rollers. The veneer is thereby pulled through the drying oven.

The drying oven 27 may form a part of a kiln 32, the baking zone of which is formed (see FIG. 3) by a channel 33 which is closed off to all sides is divided preferably by a ceramic plate 34. Below this horizontally lying plate 34 there are arranged heat resistors 35 in individual chambers and in the upper part of the channel 33 equally arranged resistors identified by the reference numeral 36. A cooling-off oven 37 follows the baking zone. It too forms a channel 38 having heat resistors 39, 40. Rollers 41, 26 are mounted at the start of the channel 38, over which rollers a continuous belt 11 is looped. The cooperating counter rollers which cooperate with the belt to effect a return thereof are not illustrated in the drawings. One of the rollers is driven and the belt 11 is used to transport the finished baked veneer. The belt is made of a high temperatureresistant material. A weight-loaded roller 12 is arranged above the roller 41 and applies a force to the finish baked veneer to assure the veneer to be frictionally grabbed by and taken along by the belt 11.

The two slip layers 13 and 20 differ according to the invention in their composition. Several suitable layers are listed hereinafter:

| First Example: | Layer 13 | Layer 20 |
|---|---|---|
| Clay | 40% | 30% |
| Hard burned fireclay | 20% | 30% |
| Feldspar | 40% | 40% |

Both layers have different shrinkage rates. Different shrinkage rates of both layer can also be obtained by replacing the common hard burned fireclay partly with glow fireclay, for example with the following composition:

| Second Example: | Layer 13 | Layer 20 |
|---|---|---|
| Clay | 30% | 30% |
| Hard burned fireclay | 15% | 30% |
| Glow fireclay | 15% | — |
| Feldspar | 40% | 40% |

In the given composition, the layers 13 and 20 have different shrinkage rates. If one desires at the same time also different coefficients of thermal expansion, then this can be achieved for example with the following composition:

| Third Example: | Layer 13 | Layer 20 |
|---|---|---|
| Clay | 30% | 30% |
| Fireclay having a high coefficient of thermal expansion | 15% | — |
| Fireclay having a low coefficient of thermal expansion | — | 30% |
| Glow fireclay having a high coefficient of thermal expansion | 15% | — |
| Feldspar | 40% | 40% |

In the composition of the layers, it is also possible to take into consideration the influence of the glaze in as far as it contributes to the deformation of the evenness of the slip layers.

The given percentages are approximate values, they can be higher and lower.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A continuous method for preparing a ceramic veneer of uniform thickness, which comprises the steps of:

depositing a first thin layer of a first thin-fluid slip onto a moving surface;

then applying a first glass fleece layer on top of said first slip layer and pressing said first glass fleece layer into said first slip layer so that said first slip layer is impregnated in said first glass fleece layer;

then depositing a second thin layer of a second thin-fluid slip on top of said first glass fleece layer, said second thin-fluid slip having a different composition than said first thin-fluid slip and having a different shrinkage rate during baking, a different coefficient of thermal expansion after baking or both a different shrinkage rate and a different coefficient of thermal expansion;

then applying a second glass fleece layer on top of said second slip layer and pressing said second glass fleece layer into said second slip layer so that said second slip layer is impregnated in said second glass fleece layer whereby to form an assembly of said layers;

then heating said assembly to dry said slips whereby to form a dry assembly;

then firing said dry assembly to form a unitary first ceramic veneer product of uniform thickness consisting essentially of two different layers and then cooling said ceramic veneer product, wherein the compositions of said slip layers are effective to cause said ceramic veneer product to remain flat and of uniform thickness during firing and cooling.

2. A method according to claim 1 including the step of applying glaze onto the upper surface of said assembly of said layers prior to said firing step whereby said ceramic veneer product has a glaze thereon.

3. A method according to claim 1 in which the solids of said first thin-fluid slip consist essentially of 40 wt. % of clay, 20 wt. % of hard burned fireclay and 40 wt. % of feldspar, and the solids of said second thin-fluid slip consist essentially of 30 wt. % of clay, 30 wt. % of hard burned fireclay and 40 wt. % of feldspar.

4. A method according to claim 1 in which the solids of said first thin-fluid slip consist essentially of 30 wt. % of clay, 15 wt. % of hard burned fireclay, 15 wt. % of glow fireclay and 40 wt. % of feldspar, and the solids of said second thin-fluid slip consist essentially of 30 wt. % of clay, 30 wt. % of hard burned fireclay and 40 wt. % of feldspar.

5. A method according to claim 1 in which the solids of said first thin-fluid slip consist essentially of 30 wt. % of clay, 15 wt. % of fireclay having a high coefficient of thermal expansion, 15 wt. % of glow fireclay having a high coefficient of thermal expansion and 40 wt. % of feldspar, and the solids of said second thin-fluid slip consist essentially of 30 wt. % of clay, 30 wt. % of fireclay having a low coefficient of thermal expansion and 40 wt. % of feldspar.

6. A ceramic veneer prepared by the method of claim 1.

* * * * *